Patented Nov. 11, 1941

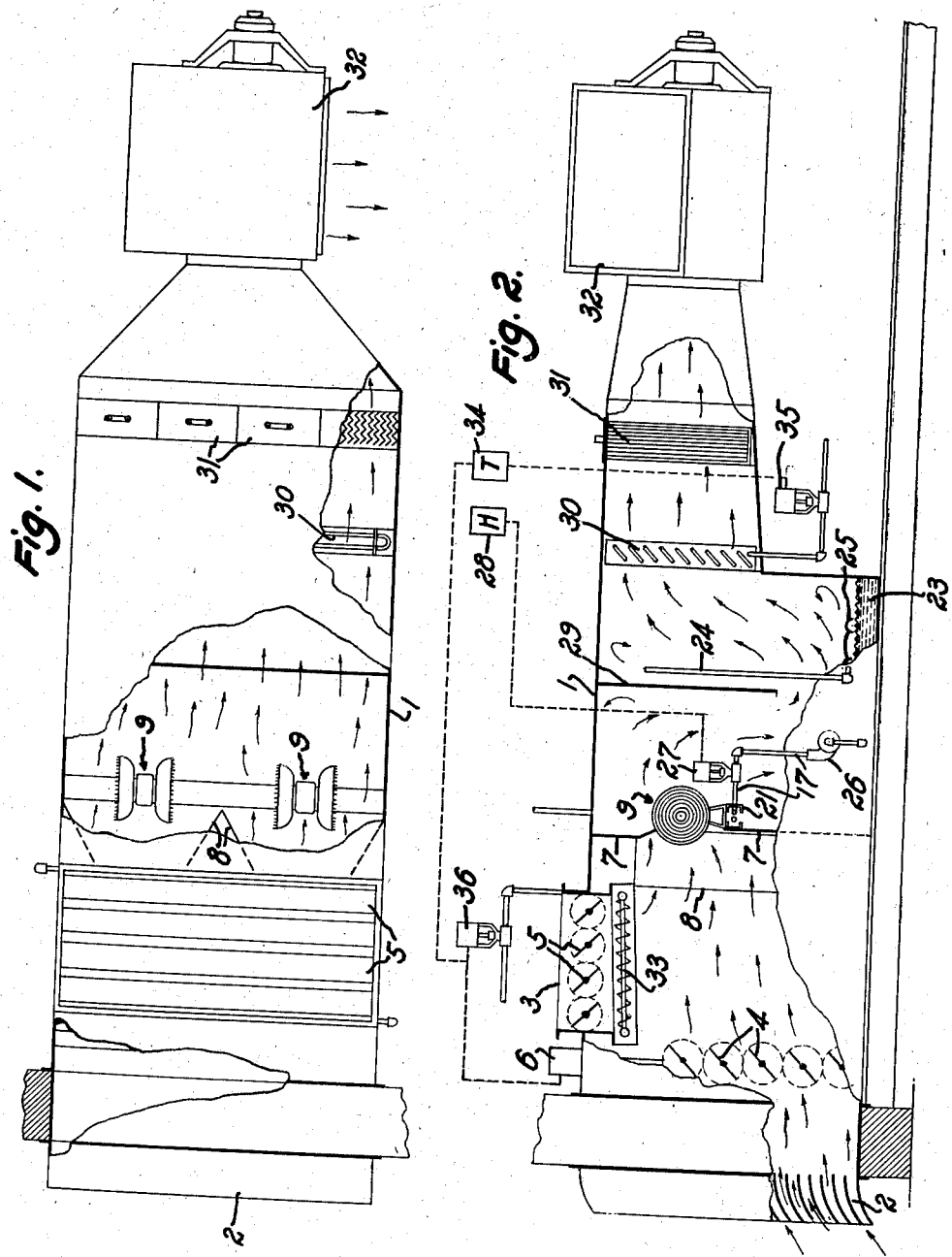

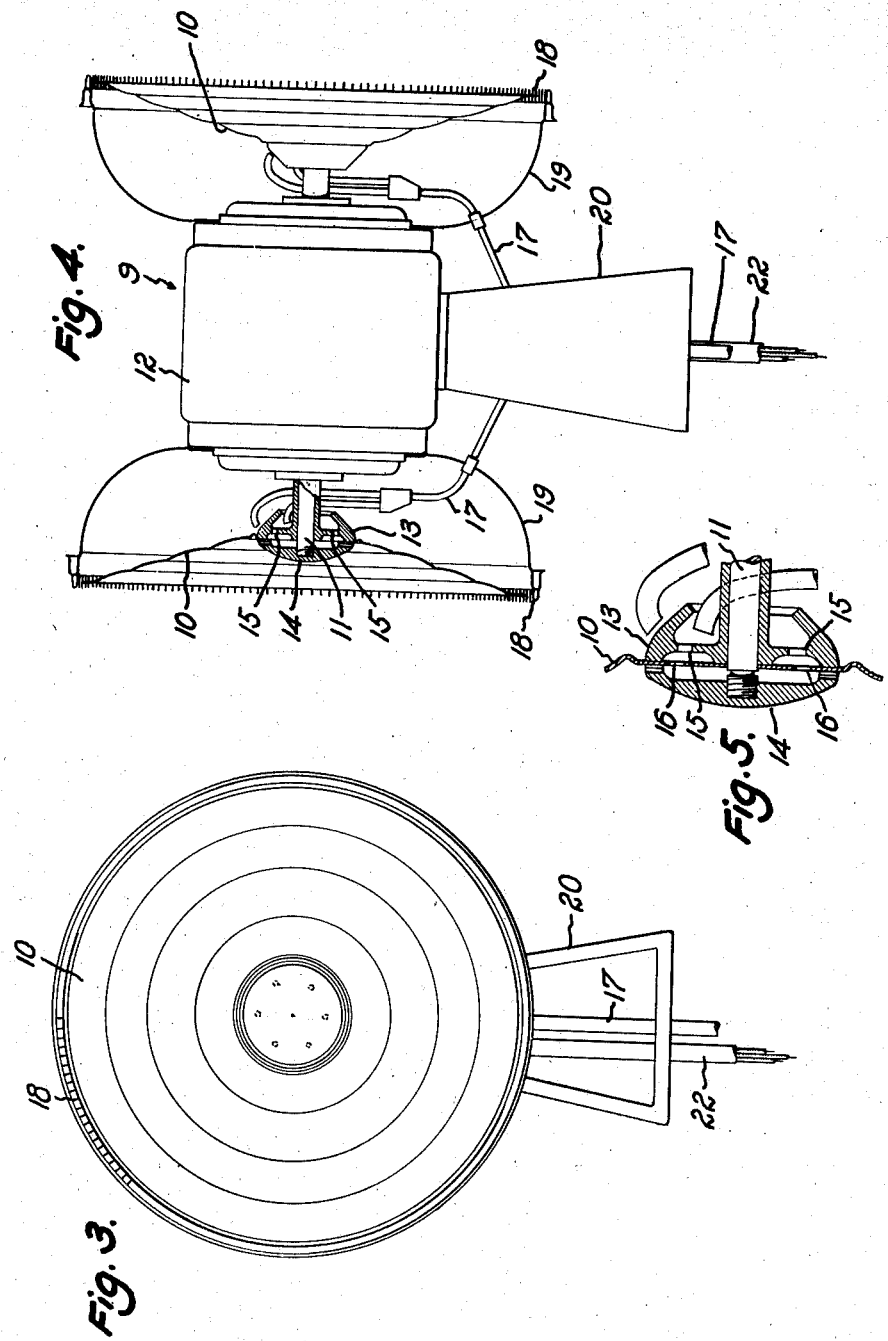

2,262,542

UNITED STATES PATENT OFFICE 2,262,542

AIR CONDITIONING APPARATUS

Agnew Bahnson, Jr., Winston-Salem, N. C.

Application May 22, 1940, Serial No. 336,679

10 Claims. (Cl. 183—21)

This invention relates to air conditioning apparatus, and particularly to apparatus of the central station type and to methods of operating the same.

The present methods of passing the air stream through sheets or sprays of water or of a dehumidifying liquid provide a moisture transfer to or from the air stream that is inefficient from the standpoint of the quantity of humidifying or dehumidifying liquid that is circulated through the conditioning chamber. The low evaporative efficiency in the case of humidification precludes a close control of the humidity through regulation of the quantity of water introduced into the treating chamber and, in general, the prior humidity control methods have been based upon the regulation of the temperature of the water supplied to the spray nozzles. These indirect methods of humidity regulation necessitate the use of relatively complex control systems and increase the power input when the temperature change for regulation of humidity is in the sense opposite that desired for a regulation of temperature per se.

According to the present invention, the water or dehumidifying liquid is introduced into the air stream in such finely divided form that approximately the entire quantity is entrained in the air stream. The transfer of water vapor to or from the air stream is thus increased to such a high rate that it becomes possible and practical to regulate the quantity of water vapor which enters or leaves the air stream by controlling the quantity of liquid that is introduced into the air stream. The temperature and the relative humidity of the air affect each other, but I have found that it is possible to regulate these factors by control systems that function independently of each other when the bulk of the treating liquid is entrained in the air stream in the air conditioning chamber. Humidifiers of the rotating disk and atomizer ring type reduce the water or liquid to a mist or cloud of fine particles that may be entrained by and quickly distributed to all parts of the air stream which is subjected to changes in direction and/or pressure.

Objects of the present invention are to provide air conditioning apparatus and methods in which a plurality of liquid atomizing devices of the rotating disk and abutment ring type produce clouds of finely divided liquid particles in an air stream within a treating chamber, and the moisture content of the air stream leaving the chamber may be controlled by regulating the quantity of liquid supplied to the atomizing devices. An object is to provide apparatus of the type stated in which the axes of the atomizing devices are transverse to the direction of air flow, and the chamber has transverse walls positioned to create eddies and pressure changes along the air stream. A further object is to provide apparatus of the type stated in which there is a liquid reservoir at the bottom of the treating chamber, a pump for lifting liquid from the reservoir to the atomizing devices, and mechanism for controlling the rate of flow of liquid to the atomizing devices in accordance with the humidity within the space that receives conditioned air from the treating chamber.

These and other objects and advantages of the invention will be apparent from the following specification when taken with the accompanying drawings in which:

Figs. 1 and 2 are plan and side elevations, respectively, of an embodiment of the invention, with parts of the outer walls broken away;

Fig. 3 is an end elevation of one of the liquid atomizing units;

Fig. 4 is a side elevation of the same, with parts in section; and

Fig. 5 is an enlarged central section through a disk and the mounting hub which provide a supply of liquid to both faces of the disk.

In the drawings, the reference numeral 1 identifies generally an air conditioning chamber having openings 2, 3 for the admission of air from the exterior and from the interior, respectively, of the building or space within which the air is to be conditioned, with vanes or louvres 4, 5 in the respective openings that are adjusted in opposite directions by a modulating motor 6 to regulate the ratio of fresh air to recirculated air that enters the chamber. The entrance end of the chamber is separated from liquid atomizing section by a vertical wall 7 in which there is an opening of substantially less area than the cross-section of the chamber, and guide vanes or plates 8 may be mounted on wall 7 to direct the flow of air through the opening. A plurality of liquid atomizing devices 9 of the rotating disk and abutment ring type are in the opening with the axes of the disks extending transversely to the direction of air flow.

For convenience of description, the atomizing devices will be referred to as "humidifiers," but it is to be understood that they function as dehumidifiers when a solution of calcium chloride or the like is supplied to the disks. Each humidifier assembly comprises disks 10 that are secured to the opposite ends of the shaft 11 of a motor 12 by a hollow hub 13 that is fixed to the shaft and a domed cap 14 that has slots across its inner edge. Openings 15, 16 through the transverse wall of the hub and the central part of the disk permit water to flow into the domed cap and along the outer face of the disk, the upper ends of the water supply pipes being branched to deliver water to the interior and to the exterior of the hub 13. A row of atomizer teeth 18 is rigidly supported at the periphery of each disk 10 by a deeply dished plate 19 that is secured to the motor casing. It is essential that the disks rotate at such speed that the bulk of the water fed to the disks is mechanically broken into mist or cloud of exceedingly fine water particles. The water mist is entrained in the air stream that sweeps the outer face of each humidifier unit, but the dished plates 19 form a casing that shields the rotating disks from the air stream. The illustrated disk and ring elements are of the type shown in the patent to Simpson, No. 1,966,872, but other designs may be used. Brackets or stands 20 serve to mount each twin disk humidifier on a hollow beam 21 that extends across the chamber and affords a convenient housing for the water supply pipes 17 and the electrical cables 22 of the motors.

The lower part of the chamber constitutes a reservoir 23 to which water is supplied through pipe 24 under control of a float valve 25. A pump 26 draws water from the reservoir and delivers it to pipe 17 at a rate determined by a modulating valve 27 which is controlled by a humidostat 28 within the space for which the air is conditioned.

A partition wall 29 extends downwardly into the chamber at a point beyond the humidifiers to lengthen the path of air flow and particularly to create regions of different pressures and velocities that facilitate the evaporation of the water mist. The water mist and air are "compacted" as they travel at relatively high velocity through the restricted opening below the partition 29, and then move upwardly at a lower velocity before passing through the heat exchanger 30 and baffle plates 31 that eliminate drops of water from the air stream as it moves to the blower 32 which discharges into the space for which the air was conditioned.

The heat exchanger 30 is preferably employed only for cooling as any requirement for additional heat can be satisfied more efficiently at a point in the air stream in advance of the humidifiers. A heating unit 33 for raising the temperature of the air is preferably arranged adjacent the opening 3 through which the recirculated air enters the treating chamber. A room thermostat 34 controls valves 35, 36, respectively, in the inlet lines to the heat exchangers 30 and 33, and also controls the modulating motor 6 that adjusts the vanes 4 and 5.

When high humidities are to be held in the space to be conditioned, or in times of peak demands on the humidity, it is sometimes economical to adjust the control valve 36 of the heating unit 33, and the louvres 4, 5 by the humidostat 28. The same results can be accomplished by varying the speed of blower fan 32 in response to humidostat 28.

Assuming that the apparatus is to condition the air in a shop or factory in which heat is generated by the machinery or the industrial processes, the operation of the apparatus is as follows. The thermostat 34 energizes the motor 6 to close the "outside air" louvres 4 and to open valve 36 to the heater 33 when the room temperature drops below a desired value. The thermostat 34 closes the heater valve 36 when the room temperature rises to the selected value, and controls motor 6 to effect a progressive opening of the outside air louvres 4 and a corresponding progressive closing of the recirculated air louvres 5 as the temperature rises above the desired value. This increase in the quantity of outside air entering the treating chamber usually results in a cooling of the air leaving the chamber for two reasons, i. e. the outside air temperature is usually lower than that within the shop, and the moisture content is usually relatively low. The outside air therefore has a direct cooling action and a further cooling action due to the evaporation of water to raise its moisture content. Unusual conditions, such as during rainy or foggy weather when the outside air approaches saturation at a temperature approximating room temperature, might result in an excess humidity within the shop and, as a supervisory control upon the modulating motor 6, the humidostat 28 may be connected to the motor to retain the outside air louvres 4 in closed position when the room humidity rises above the desired value.

The supply of moisture to the air stream is controlled directly by the modulating valve 27 that regulates the rate of flow of water to the rotary disk humidifiers. As stated above, the water delivered to the disks is so finely divided by impact upon the atomizer rings that it is approximately completely entrained in the air stream and quickly evaporated. The relative humidity of the air stream may therefore be regulated by controlling the rate of water supply and it is not necessary, as was required by prior practice, to deliver a great excess of water to the treating chamber to regulate the quantity of moisture leaving the treating chamber by controlling the temperature of the air.

The air stream delivered by the blower may be saturated or may carry entrained water particles when there is a maximum demand for moisture within the shop, but the moisture content may be far below saturation at the exit air temperature when there is a lesser demand for moisture to maintain the desired relative humidity in the shop or factory space.

The quantity of water supplied to the humidifiers is not greatly in excess of that which is evaporated in the air stream, and the power input for supplying water to an air conditioning chamber having rotary disk humidifiers is far below that required for the known atomizer nozzle and water sheet types of humidifiers.

The decreased power consumption is important, but it is not the only advantage of the rotary disk type of humidifier in a central station installation. A closer regulation of humidity is possible, and both the initial and the maintenance costs are lowered as there is no problem of cleaning the equipment to keep it in good operating condition. Tests have shown that only four rotating disks of 15" diameter and operated at 3450 R. P. M. will be as effective as one hundred atomizing nozzles and, as is well known, the atomizer nozzles must be cleaned and adjusted frequently to keep them in good condition.

It is to be understood that the embodiment herein shown and described is illustrative of the invention but that various changes may be made without loss of the apparently contradictory features of reduced power input and closer regulation of temperature and humidity conditions. The modulation of the water supply, for example, may be a step-by-step control obtained by an on-and-off regulation of the supply of water to individual disks or groups of disks but a progressive variation of the rate of water supply by a modulating valve is usually preferable. This and other modifications of the apparatus fall within the spirit of my invention as set forth in the following claims.

I claim:

1. Air conditioning apparatus comprising a treating chamber and means for establishing a flow of air through the same, a plurality of rotary disks in said chamber and each surrounded by an abutment ring, the axes of said disks being transverse to the direction of air flow, a dished plate supporting each abutment ring and shielding the associated disk from the air stream, means for supplying liquid to said disks, and means for rotating said disks at a speed at which substantially the entire quantity of liquid thrown by said disks is dispersed into a mist by impact upon said abutment rings.

2. Air conditioning apparatus as claimed in claim 1, in combination with a partition extending partly across said chamber at a point beyond and spaced from said disks, thereby to produce eddy currents and regions of different pressures and velocities in the air stream.

3. Air conditioning apparatus according to claim 1, in combination with means for eliminating liquid particles from the air stream leaving the chamber.

4. Air conditioning apparatus comprising a treating chamber and means for establishing a flow of air through the same, said chamber including a transverse wall having an opening therethrough of less area than the cross-section of said chamber, a plurality of rotary disks in said opening and each surrounded by an abutment ring, the axes of said disks being transverse to the direction of air flow, means for supplying liquid to said disks, and means for rotating said disks at a speed at which substantially the entire quantity of liquid thrown by said disks is dispersed into a mist by impact upon said abutment rings.

5. Air conditioning apparatus comprising a treating chamber, adjustable ports at the entrance end of said chamber and opening respectively to the interior and to the exterior of the space for which the air is to be conditioned, means for establishing a flow of air through said chamber from the entrance end thereof and into said space, a plurality of atomizers of the rotating disk and abutment ring type in axial alinement transversely of said chamber, and means for supplying liquid to said disks.

6. Air conditioning apparatus as claimed in claim 5, wherein said liquid supplying means includes means for varying the rate of liquid supply to said atomizers.

7. Air conditioning apparatus as claimed in claim 5, wherein said liquid supplying means comprises a reservoir of liquid at the bottom of said chamber, a pump for lifting liquid from said reservoir to said atomizers, and means for controlling the rate of flow of liquid from said pump to said atomizers.

8. Air conditioning apparatus as claimed in claim 5, in combination with a heat exchanger within said chamber and adjacent the port that opens into the space for which the air is to be conditioned.

9. Air conditioning apparatus comprising a treating chamber, adjustable ports at the entrance end of said chamber and opening respectively to the interior and to the exterior of the space for which the air is to be conditioned, means for establishing a flow of air through said chamber from the entrance end thereof and into said space, a plurality of atomizers of the rotating disk and abutment ring type in axial alinement transversely of said chamber, guide means at said atomizing apparatus to impart to the air stream a relatively high velocity parallel to the rotating disks, means for supplying liquid to said disks.

10. Air conditioning apparatus comprising a chamber having openings communicating respectively with the interior and exterior of the space to be conditioned, means for establishing a flow of air through said chamber and into the space, adjustable means in said openings for varying the effective sizes thereof in opposite sense to determine the relative quantities of recirculated air and of fresh air brought into said chamber, a plurality of humidifiers within said chamber for dispersing water into a fine mist, said humidifiers being of the rotating disk and atomizer ring type, means for regulating the supply of water to said humidifiers, a heat exchanger within said chamber, means including a thermostat within said space for controlling said heat exchanger and said adjustable means at the openings to said chamber to regulate the temperature in said space, and a humidostat within the space for controlling said regulating means in accordance with the humidity to be maintained in said space.

AGNEW BAHNSON, Jr.